(12) United States Patent
Saeck et al.

(10) Patent No.: US 9,257,897 B2
(45) Date of Patent: Feb. 9, 2016

(54) CIRCUIT ARRANGEMENT FOR PROTECTING ELECTRONIC DEVICES AGAINST INCORRECT LOGIC VOLTAGES

(75) Inventors: Klaus-Peter Saeck, Detmold (DE); Thomas Warneke, Hoexter (DE); Viktor Oster, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 634 days.

(21) Appl. No.: 12/604,605

(22) Filed: Oct. 23, 2009

(65) Prior Publication Data

US 2010/0103567 A1 Apr. 29, 2010

(30) Foreign Application Priority Data

Oct. 29, 2008 (DE) .................. 10 2008 053 702

(51) Int. Cl.
*H02H 7/10* (2006.01)
*H02M 1/32* (2007.01)
*H02M 3/02* (2006.01)

(52) U.S. Cl.
CPC . *H02M 1/32* (2013.01); *H02H 7/10* (2013.01); *H02M 3/02* (2013.01)

(58) Field of Classification Search
USPC ........................................................ 361/18
See application file for complete search history.

(56) References Cited

U.S. PATENT DOCUMENTS

| | | | | |
|---|---|---|---|---|
| 5,428,523 A | * | 6/1995 | McDonnal | H02J 1/10 307/58 |
| 5,596,465 A | * | 1/1997 | Honda et al. | 361/18 |
| 5,659,465 A | * | 8/1997 | Flack et al. | 363/71 |
| 5,663,874 A | * | 9/1997 | Mader | H02M 3/33507 363/131 |
| 5,710,699 A | * | 1/1998 | King et al. | 363/132 |
| 5,774,736 A | * | 6/1998 | Wright | G06F 11/2015 713/321 |

(Continued)

FOREIGN PATENT DOCUMENTS

| | | |
|---|---|---|
| DE | 37 32 334 A1 | 4/1989 |
| EP | 0 972 389 B1 | 1/2000 |

(Continued)

OTHER PUBLICATIONS

Albrego Villafuerte, "European Office Action for Interntanional Application No. 09013157.4-1233", Mar. 24, 2010, Publisher: European Patent Office, Published in: EP.

(Continued)

*Primary Examiner* — Ronald W Leja
(74) *Attorney, Agent, or Firm* — Kaplan Breyer Schwarz & Ottesen, LLP

(57) ABSTRACT

The invention is based on the problem of devising a circuit arrangement (10) for protecting electronic devices from incorrect logic voltages, wherein this circuit arrangement delivers increased protection against overvoltages, so that this circuit arrangement could also be used in multi-channel fail-safe systems that satisfy, for example, Performance Level "e" according to DIN EN ISO 13849. The circuit arrangement (10) has an input terminal (80) for connecting a power supply device and at least one voltage converter (90) that delivers, on the output side, an adjustable logic voltage. A controllable switching element (70) is connected between the one or more voltage converters (90, 95) and the input terminal (80). Furthermore, a first monitoring device (20) is provided for monitoring the logic voltage. The first monitoring device (20) is constructed so that it triggers the opening of the switching element (70) when the logic voltage reaches or exceeds a predetermined threshold.

5 Claims, 1 Drawing Sheet

(56) References Cited

U.S. PATENT DOCUMENTS

| | | | | |
|---|---|---|---|---|
| 5,978,195 | A | * | 11/1999 | Goder et al. ............... 361/94 |
| 6,100,677 | A | * | 8/2000 | Farrenkopf ............... 323/285 |
| 6,204,648 | B1 | * | 3/2001 | Saeki et al. ............... 323/282 |
| 6,225,794 | B1 | * | 5/2001 | Criscione et al. ............... 323/283 |
| 6,275,958 | B1 | * | 8/2001 | Carpenter et al. ............... 714/48 |
| 6,940,189 | B2 | * | 9/2005 | Gizara ............... 307/151 |
| 7,030,694 | B2 | * | 4/2006 | Jonkman ............... 330/251 |
| 7,557,637 | B2 | * | 7/2009 | Sakamoto ............... 327/519 |
| 7,705,579 | B1 | * | 4/2010 | Hariman et al. ............... 323/284 |
| 7,723,922 | B2 | * | 5/2010 | Lee et al. ............... 315/210 |
| 2004/0218405 | A1 | * | 11/2004 | Yamada et al. ............... 363/18 |
| 2005/0024908 | A1 | * | 2/2005 | Gizara ............... 363/147 |
| 2005/0264329 | A1 | * | 12/2005 | Ott ............... 327/143 |
| 2007/0121350 | A1 | * | 5/2007 | Duvnjak ............... H02M 3/33561 363/21.01 |
| 2008/0012542 | A1 | | 1/2008 | Liu et al. |
| 2008/0309163 | A1 | * | 12/2008 | Hashimoto ............... H02J 7/0029 307/31 |
| 2008/0315780 | A1 | * | 12/2008 | Lee et al. ............... 315/210 |
| 2009/0039857 | A1 | * | 2/2009 | Li et al. ............... 323/285 |
| 2009/0224602 | A1 | * | 9/2009 | Tsukamoto ............... H02M 3/156 307/31 |
| 2010/0229915 | A1 | * | 9/2010 | Ledenev et al. ............... 136/244 |

FOREIGN PATENT DOCUMENTS

| | | |
|---|---|---|
| EP | 1094586 A2 | 4/2001 |
| EP | 1 154 538 A1 | 11/2001 |
| JP | 05336652 A | 12/1993 |

OTHER PUBLICATIONS

"Related EP Patent Application No. EP 09 013 157.4 Office Action", Apr. 2, 2014, Publisher: EPO, Published in: EP.

* cited by examiner

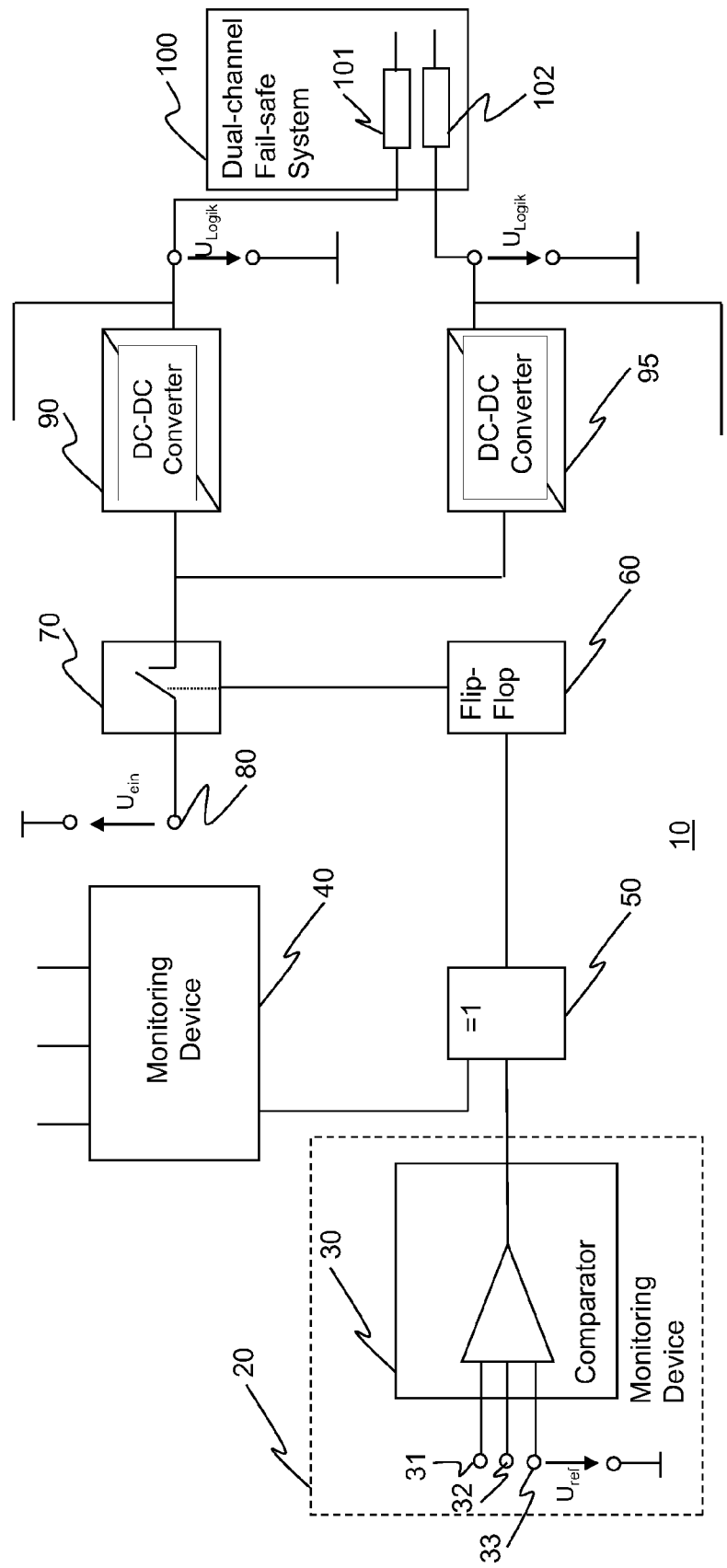

CIRCUIT ARRANGEMENT FOR PROTECTING ELECTRONIC DEVICES AGAINST INCORRECT LOGIC VOLTAGES

FIELD OF INVENTION

The invention relates to a circuit arrangement for protecting electronic devices against incorrect logic voltages as well as to a fail-safe system for the multi-channel monitoring of a safety-related device with such a circuit arrangement.

BACKGROUND OF THE INVENTION

Circuits that protective against undervoltages and overvoltages have been known for a long time.

The invention is based on the problem of devising a circuit arrangement for protecting electronic devices against incorrect logic voltages, wherein this circuit arrangement delivers increased protection against overvoltages, so that this circuit arrangement could also be used in multi-channel fail-safe systems that satisfy, for example, Performance Level "e" according to DIN EN ISO 13849.

SUMMARY OF THE INVENTION

Accordingly, a circuit arrangement for protecting electronic devices against incorrect logic voltages is provided. The circuit arrangement has an input terminal for connecting a power supply device that can deliver a DC voltage or an AC voltage. Furthermore, at least one voltage converter is provided that delivers, on the output side, a preferably adjustable logic voltage. A controllable switching element, for example, a switching transistor, is connected between the one or more voltage converters and the input terminal. A first monitoring device is used to monitor the logic voltage. The first monitoring device is constructed such that it triggers the opening of the switching element when the logic voltage reaches or exceeds a predetermined threshold.

It should be noted that the logic voltage is understood to be the output voltage of the voltage converter. The logic voltage thus forms the power supply voltage for the electronic devices.

The circuit arrangement allows the voltage to be directly monitored where it could have a dangerous effect, namely, at the output of the voltage converter. In this way, the functionality of the voltage converter is simultaneously also monitored.

If the power supply device delivers a DC voltage, in the case of the voltage converter it could involve a DC-DC converter, that is, a DC-voltage converter. At this point it should be noted that DC-DC converters usually have integrated voltage-monitoring devices that monitor the output voltage. In this way, with the proposed circuit arrangement, the output voltage of the voltage converter is monitored redundantly, so that the circuit arrangement could also be used in the field of safety technology.

According to one advantageous refinement, several voltage converters could also be connected in parallel and connected to the input terminal via the switching element. The voltage converters could also provide different logic voltages on the converter outputs.

In a safety-related environment, it is necessary that when a defect occurs, the devices to be secured can be kept in a secured state.

For this purpose, the circuit arrangement has a device for the secure holding of the switching element in the open state. In the case of the holding device, it can involve, for example, a flip-flop.

In order to enhance the capability of the circuit arrangement and to guarantee higher security, a second monitoring device could be provided that monitors, for example, the voltage on the input terminal, the functionality of the first monitoring device, and/or the functionality of the switching element. If the second monitoring device determines that there is an error, then it also triggers the opening of the switching element. The second monitoring device can be also assigned to an emergency cutoff switch that could be activated manually.

One special field of application for the proposed circuit arrangement is safety technology.

Consequently, a fail-safe system for the multi-channel monitoring of a safety-related device, for example, a protective door, is further proposed. The fail-safe system has several channels, to each of which a logic device is assigned. Furthermore, the fail-safe system contains the previously described circuit arrangement, wherein the output of the one or more voltage converters is connected to at least one logic device. Accordingly, the logic voltage provided by the voltage converter can be applied to the logic device of each channel. Alternatively, several voltage converters could be connected in parallel that each supplies a separate logic device.

The circuit arrangement can be built economically and with small spatial requirements, since it allows power to be supplied to both channels by means of a single power supply device and protects both channels from overvoltages. Thanks to the proposed circuit arrangement, it is not necessary to decouple the channels of the fail-safe system.

It should be noted at this point that the logic devices could also be protected against undervoltages. For this purpose, standardized reset components could be used that are present in conventional voltage converters and thus create no additional costs. Optionally or additionally, for this purpose, the first and/or second monitoring device could also be formed accordingly.

BRIEF DESCRIPTION OF THE DRAWINGS

The invention will be explained in more detail below with reference to an embodiment in connection with a single FIGURE.

DETAILED DESCRIPTION

The FIGURE shows an example circuit arrangement 10 with which a known multi-channel fail-safe system 100 can be protected against overvoltages. In the present example, the fail-safe system 100 has two decoupled channels. The circuit arrangement 10 has a first monitoring device 20 that contains, for example, a comparator 30. The comparator 30 has the task of monitoring logic voltages that can be applied to the input terminals 31 and 32. For this purpose, the logic voltages are compared with a reference voltage that is applied to the input 33 of the comparator 30. Optionally, another monitoring device 40 could be provided. The outputs of the two monitoring devices 20 and 40 are connected, for example, to an OR-gate 50. The output of the OR-gate 50 is connected, for example, to a flip-flop 60, which controls, in turn, a controllable switching element 70. The controllable switching element can be, for example, a field-effect transistor. The circuit arrangement 10 has an input terminal 80 in which, for example, a DC voltage $U_{ein}$ can be applied by means of a not-shown power-supply device. The input terminal 80 is connected by means of the switching element 70, for example, to the input of a DC-DC converter 90 and to the input of a DC-DC converter 95. On the output side, each of the two DC-DC converters 90 and 95 delivers the logic voltage $U_{logik}$ to be monitored. In the present example, the logic voltage delivered by the DC-DC converter 90 powers the logic device 101, while the logic voltage delivered by the DC-DC converter 95 powers the logic device 102 of the dual-channel fail-safe system 100. The logic voltages provided by the DC-DC converters 90 and 95 are each fed, for example, by means of a voltage divider (not shown) to the input 31 or 32 of the comparator 30.

The task of the monitoring device 20 is to separate both logic devices 101 and 102 of the dual-channel fail-safe system 100 from the input voltage $U_{ein}$ applied to the input terminal 80, as soon as at least one of the monitored logic voltages reaches or exceeds a predetermined threshold. In this way, it is achieved that, although both channels of the fail-safe system 100 are powered by a common power-supply device, when an incorrect logic voltage is identified, both logic devices 101 and 102 are immediately separated from the power-supply device.

The second monitoring device 40 can be used, for example, to monitor the input terminal 80 and thus the input voltage, the functionality of the switching element 70, of the monitoring device 20, of the OR-gate 50, of the DC-DC converters 90 and 95, and/or of the flip-flop 60. Furthermore, an emergency off signal could be directly supplied to the OR-gate 50 or a corresponding emergency cutoff switch could be connected to the monitoring device 40.

The operation of the circuit arrangement 10 shown in the FIGURE will be explained below in more detail.

As long as none of the logic voltages provided by the DC-DC converters 90 and 95 exceeds a given threshold and also as long as the monitoring device 40 has not identified a defect, the output signal of both monitoring devices is a logical zero. Consequently, the output signal of the OR-gate 50 is also a logical zero. In response to the output signal of the OR-gate 50, the flip-flop 60 provides that the switching element 70 be closed, i.e., that it conduct. The input voltage $U_{ein}$ on the input terminal 80 is then applied to the appropriate input of the two DC-DC converters 90 and 95. In this case, the two logic units 101 and 102 of the dual-channel fail-safe system 100 are each powered with a defect-free logic voltage.

However, if the comparator 30 of the monitoring device 20 determines that one or both of the DC-DC converters are delivering too high a logic voltage, then the comparator 30 sets the input of the OR-gate 50 to 1, so that, on the output of the OR-gate 50, a logical one is applied. In response to the logical one, the flip-flop 60 is controlled such that it opens the switching element 70, i.e., that is in a blocking state. In this way, both DC-DC converters 90 and 95 are separated from the input voltage on the input terminal 80 and thus both logic units 101 and 102 of the dual-channel fail-safe system 100 are switched off, whereupon a safety-related device to be monitored (not shown) can be moved into a secure state.

In another example scenario, the monitoring device 20 determines that both DC-DC converters 90 and 95 are operating properly and provide a predetermined logic voltage. But here, the monitoring device 40 detects an error.

An error can be that the input voltage applied to the input terminal 80 has changed in an impermissible way. In response to such an error, the monitoring device 40 generates, on the output side, a logical one that sets the output of the OR-gate to a logical one. The output signal of the OR-gate 50 is supplied to the flip-flop 60 that then controls switching element 70 into an electrically blocking state. Also in this case, the power supply to the two logic units 101 and 102 of the dual-channel fail-safe system 100 is immediately shut down.

The flip-flop 60 ensures that, when an error occurs, the switching element 70 remains continuously open, so that, at the input of the two DC-DC converters 90 and 95, no input voltage is applied. Only by applying a targeted reset signal to the flip-flop 60 is the switching element 70 again closed, i.e., controlled to be in an electrically conductive state.

As already mentioned, the monitoring device 40 could also monitor or actively test the functionality of the other components of the circuit arrangement 10 and, for the detection of an error, can generate a logical high level that controls the switching element 70 into an electrically blocking state by means of the OR-gate 50 and the flip-flop 60.

At this point, another alternative embodiment shall be mentioned in which the two logic devices 101 and 102 can be connected in common either to the DC-DC converter 90 or to the DC-DC converter 95.

The circuit arrangement 10 described as an example thus allows the powering and monitoring of a multi-channel fail-safe system by means of a single power supply device that powers both logic devices 101 and 102. If an increase in one or two logic voltages is identified, the dual-channel fail-safe system 100 is immediately separated from the power supply. In particular, if an error occurs in one or both DC-DC converters, which leads to too high a logic voltage, then both logic units of the dual-channel fail-safe system 100 are separated from the input terminal 80 and thus from the power supply device.

Thanks to the proposed circuit arrangement 10 it is not necessary to decouple the channels of the dual-channel fail-safe system 100, which, as mentioned, allows a common power supply of the two logic devices 101 and 102.

What is claimed is:

1. A fail-safe system for multi-channel monitoring of a safety-related device, the fail-safe system comprising:
    at least first and second logic devices (101, 102) each of which being associated to a separate channel and being to be protected against faulty logic voltages;
    an input terminal (80) for connecting a power-supply device for supplying an input voltage;
    a controllable switching element (70) connected between the input of a first DC-DC converter (90) and the input terminal (80) and between the input of at least a second DC-DC converter (95) and the input terminal (80) for passing or blocking the input voltage, wherein:
       the first DC-DC converter (90) includes an integrated voltage monitoring device that monitors the output voltage from the first DC-DC converter (90),
       the first DC-DC converter (90) is configured to supply a first logic voltage as an output voltage to the first logic device (101),
       the at least one second DC-DC converter (95) includes an integrated voltage monitoring device that monitors the output voltage from the second DC-DC converter (95), and
       the at least one second DC-DC converter (95) is configured to supply a second logic voltage as an output voltage to the second logic device (102); and
    a first monitoring device (20) for redundantly monitoring the first and second logic voltages outputted by the first and second DC voltage converters (90, 95), the first monitoring device (20) comprising a comparator (30) which is supplied with the first and second logic voltages and a reference voltage, so that the first monitoring device (20) drives a holding means (60) for opening and reliably holding the switching element (70) in the open state, if at least one of the first and second logic voltages monitored by the first monitoring device reaches or exceeds the reference voltage.

2. The fail-safe system according to claim 1, wherein a second monitoring device (40) is provided in parallel to the first monitoring device (20) to cause the switching element (70) to be opened in response to a predefined event.

3. The fail-safe system according to claim 2, wherein the second monitoring device (40) monitors the voltage at the power supply terminal, the second logic voltage, the operability of the first monitoring device (20), and/or the operability of the switching element (70).

4. The fail-safe system according to claim 3, wherein the first and second monitoring devices (20; 40) are connected to the holding means (60) via an OR gate (50) to cause the holding means (60) to open the switching element (70) and to hold it in the open state in case of an event.

5. The fail-safe system according to claim 1, wherein the holding means (60) is a flip-flop.

* * * * *